United States Patent Office 3,156,696
Patented Nov. 10, 1964

3,156,696
CONDENSATION POLYMERS OF PYRIDYL POLYBENZOIC ACIDS WITH GLYCOLS
Ellis K. Fields, Chicago, Ill., assignor to Standard Oil Company, Chicago, Ill., a corporation of Indiana
No Drawing. Filed Feb. 28, 1961, Ser. No. 92,129
3 Claims. (Cl. 260—295)

This invention relates to a new class of polyesters and more specifically pertains to polyesters derived by reacting a polyhydric alcohol and a pyridine polybenzoic acid.

The new class of polyesters of this invention are polyesters derived by reacting a pyridine polybenzoic acid having the general formula:

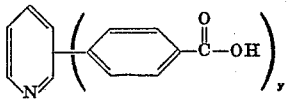

wherein $y$ is an integer from 2 to 3, with a polyhydric alcohol having the formula HO—(R)$_x$—OH wherein R is a divalent hydrocarbon group containing from 2 to 20 carbon atoms such as ethylene glycol, propylene glycol, dihydroxy cyclohexane, bis-methylol benzene and 1,1-dimethyl-1,1-di(p-hydroxyphenyl) methane, also known as Bisphenol A. The polyesters can be employed as surface coating films, preferably plasticized with from about 1 to 5% by weight of a lower alkyl phthalate such as dimethylphthalate, diisopropylphthalate, di-n-butylphthalate and the like. Such films can be conveniently baked at about 100° C. to a tough, clear, non-brittle film. The polyesters of this invention, in general, have high softening points and high melting points. The polyesters of this invention are also useful in the preparation of polyurethanes by reacting the esters with isocyanates.

In the preparation of polyesters of this invention the ratio of polyhydric alcohol to pyridine polybenzoic acid can be varied from 1 to 20 moles of polyalcohol per mole of acid. Copolyesters may be prepared by using, in addition to the pyridine polybenzoic acid, such dicarboxylic acids as succinic, glutaric, adipic, pimelic, terephthalic, isophthalic, benzophenone dicarboxylic and diphenyl sulfone dicarboxylic acids. Further modification can be obtained by the use of monohydric alcohols and drying oils. The latter modification is useful in the preparation of alkyd type resins.

The polyesters of this invention can be illustrated by the following examples.

*Example 1*

To a solution of 4.56 g., 0.02 mole, Bisphenol A and 4 g., 0.1 mole NaOH in 200 ml. water rapidly stirred in a Waring Blendor is added a solution of 1.02 g. (0.0025 mole) 4-phenyl-2,6-pyridine di-p-benzoyl chloride in 100 ml. HCCl$_3$. The polymer is filtered, washed with water and methanol and dried. Two grams of off-white color solid is recovered.

*Analysis.*—Calcd. for

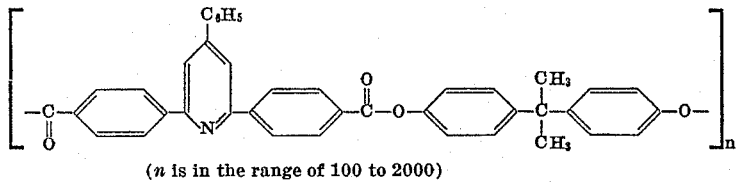

($n$ is in the range of 100 to 2000)

(C$_{40}$H$_{30}$NO$_5$)$_n$; N, 2.33. Found: N, 1.75.
This polyester softens at 220° C., and melts at 270° C.

It is soluble in dimethylformamide. A film deposited from its solution in dimethylformamide on glass is very hard, but slightly brittle. Addition of 2% by weight of polyester of di-n-butyl phthalate to the dimethylformamide solution and subsequent baking at 100° C. resulted in a tough, clear film with no brittleness.

In addition to the polyester of Example 1, a high molecular weight polyester can be obtained by reacting 2,6-(p-carboxyphenyl) pyridine with ethylene glycol or ethylene oxide, one mole of glycol or oxide per mole equivalent to COOH group, to form the bis(hydroxyethyl) ester and then heating this ester product under reduced pressure and from 250 to 350° C. while removing ethylene glycol split out.

Also 2,4,6-tri-(p-carboxyphenyl) pyridine can be reacted in a similar manner as described in Example 1, preferably using the tri-acid chloride with 3 moles of Bisphenol A to form a high molecular weight polyester. Ethylene glycol reacted with 2,4,6-tri-(p-carboxyphenyl) pyridine produces an ester product which can be condensed, or reacted with a dicarboxylic acid such as adipic acid to form a macromolecular copolyester having predominantly OH groups or COOH groups as terminal groups depending on the ratio of ester to adipic acid.

*Example 2*

Ethylene glycol is reacted with 2,6-di(p-carboxyphenyl) pyridine in the ratio of 5 parts by weight of the glycol per part of the pyridine dibenzoic acid. The excess of glycol over that required to react with the carboxy groups is employed to have a fluid reaction medium. The reaction is carried out in a nitrogen atmosphere in a stirred closed autoclave starting with a nitrogen pressure of 50 to 100 p.s.i.g. at ambient temperature. The autoclave contents are heated to about 200° C. for 2 to 5 hours. Thereafter the excess glycol and by-product water is removed by distillation gradually reducing the pressure to 100 to 50 mm. Hg and distillation is continued. When substantially all of the excess glycol is removed, the pressure is further reduced and the ester product is heated gradually to about 340 to 350° C. with stirring at 5 to 10 mm. Hg while removing glycol split out during the condensation reaction taking place at this higher temperature. When no further glycol is split out, the resulting high molecular weight polyester is withdrawn and cooled in an inert oxygen-free atmosphere such as a nitrogen atmosphere. The high molecular weight polyester is a solid at room temperature.

What is claimed is:
1. A polyester obtained by the reaction of a pyridine polybenzoic acid having the formula

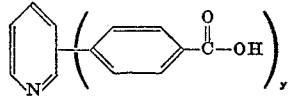

wherein $y$ is an integer from 2 to 3, with from 1 to 20 moles of a diol selected from the class consisting of ethylene glycol, propylene glycol, dihydroxy cyclohexane, bismethylol benzene and 1,1-dimethyl-1,1-di(p-hydroxyphenyl) methane.

2. A polyester having the ester units

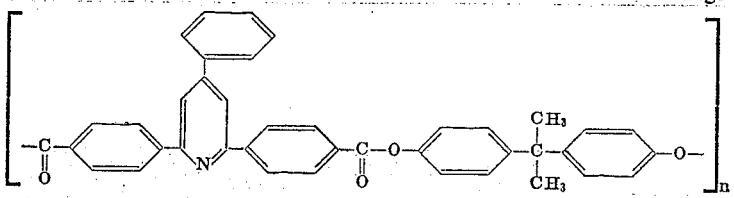

wherein $n$ is in the range of from 100 to 2000, having an ambient softening point of 220° C. and a melting point of 270° C. and is soluble in dimethylformamide.

3. A polyester obtained by reacting ethylene glycol with 2,6-di(p-carboxyphenyl) pyridine in the ratio of 5 parts of glycol per part of said dicarboxylic acid by weight in a nitrogen atmosphere at 200° C. until the bis-glycolate is formed, heating the bis-glycolate to a temperature in the range of 250 to 350° C. while removing ethylene glycol by distillation and while reducing the pressure to 5 to 10 mm. Hg until substantially no further glycol remains distilled and recovering the polyester formed.

References Cited in the file of this patent

Bergmann: "The Chemistry of Acetylene and Related Compounds," page 80 (Interscience), 1948.